US009369361B2

United States Patent
Bakshi et al.

(10) Patent No.: US 9,369,361 B2
(45) Date of Patent: Jun. 14, 2016

(54) METHOD AND APPARATUS FOR CLEARING HANG CALLS

(71) Applicant: AT&T Intellectual Property I, L.P., Atlanta, GA (US)

(72) Inventors: Yury Bakshi, Morganville, NJ (US); Eric Noel, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/978,086

(22) Filed: Dec. 22, 2015

(65) Prior Publication Data

US 2016/0112290 A1 Apr. 21, 2016

Related U.S. Application Data

(63) Continuation of application No. 12/641,966, filed on Dec. 18, 2009, now Pat. No. 9,231,785.

(51) Int. Cl.
*H04L 12/26* (2006.01)
*H04L 12/66* (2006.01)
*H04M 7/00* (2006.01)
*H04M 3/08* (2006.01)
*H04M 3/22* (2006.01)

(52) U.S. Cl.
CPC ............ *H04L 43/0847* (2013.01); *H04L 43/10* (2013.01); *H04M 7/006* (2013.01); *H04L 12/66* (2013.01); *H04M 3/08* (2013.01); *H04M 3/2254* (2013.01)

(58) Field of Classification Search
CPC ..... H04L 12/66; H04L 43/0847; H04L 43/10; H04M 3/08; H04M 3/22; H04M 3/2254; H04M 7/006
See application file for complete search history.

(56) References Cited

U.S. PATENT DOCUMENTS

| 6,724,756 B2 | 4/2004 | Fourie et al. |
| 7,428,209 B1 | 9/2008 | Roberts |
| 7,609,706 B2 | 10/2009 | Scott et al. |
| 7,855,949 B1 | 12/2010 | Cortez et al. |
| 8,126,491 B1 * | 2/2012 | Choi-Grogan ...... H04W 76/028 455/423 |
| 8,139,479 B1 * | 3/2012 | Raszuk ............... H04L 43/0811 370/217 |
| 8,531,976 B2 * | 9/2013 | Vasseur ............... H04L 41/0677 370/248 |
| 8,848,545 B1 | 9/2014 | Huntsman et al. |
| 2001/0050907 A1 | 12/2001 | Madour et al. |
| 2002/0166080 A1 | 11/2002 | Attanasio et al. |
| 2005/0018599 A1 | 1/2005 | Mahasoom et al. |
| 2005/0259647 A1 | 11/2005 | Wakumoto et al. |
| 2006/0104218 A1 * | 5/2006 | Kako ........................ H04J 3/14 370/252 |
| 2006/0227754 A1 | 10/2006 | Ko |
| 2006/0274645 A1 | 12/2006 | Bradford et al. |
| 2007/0104120 A1 | 5/2007 | Shah-Heydari |
| 2007/0127479 A1 * | 6/2007 | Sinicrope ............ H04L 12/4633 370/392 |
| 2007/0195752 A1 * | 8/2007 | Gayde ..................... H04L 12/66 370/352 |
| 2007/0274284 A1 | 11/2007 | Dendukuri et al. |
| 2008/0025320 A1 | 1/2008 | Bangalore et al. |

(Continued)

*Primary Examiner* — Parth Patel
*Assistant Examiner* — Kai Chang

(57) ABSTRACT

A method, computer readable medium and apparatus for clearing hang calls in a communication network are disclosed. For example, the method detects a failure of an adjacent call stateful network element in a signaling path, identifies one or more calls that are affected by the failure of the adjacent call stateful network element, tests a media path of the one or more calls for activity and clears the one or more calls that are affected by the failure of the adjacent call stateful network element if the media path of the one or more calls is inactive.

20 Claims, 8 Drawing Sheets

(56) References Cited

U.S. PATENT DOCUMENTS

| | | |
|---|---|---|
| 2008/0285471 A1 | 11/2008 | Tegeler |
| 2008/0310433 A1 | 12/2008 | Retana et al. |
| 2009/0161549 A1 | 6/2009 | Qian et al. |
| 2009/0201804 A1 | 8/2009 | Johri et al. |
| 2010/0149974 A1 | 6/2010 | Ohtsu et al. |
| 2010/0287406 A1* | 11/2010 | Ishii ............... H04L 45/22 714/4.1 |
| 2011/0090786 A1* | 4/2011 | Liu ............... H04L 12/5695 370/221 |
| 2011/0103370 A1* | 5/2011 | Igval ............... G10L 25/78 370/352 |

\* cited by examiner

METHOD AND APPARATUS FOR CLEARING HANG CALLS

This application is a continuation of U.S. patent application Ser. No. 12/641,966, filed Dec. 18, 2009, which is currently allowed and is herein incorporated by reference in its entirety.

BACKGROUND

With the separation of call and media processing (e.g. voice over Internet protocol (VoIP)) combined with the distribution of call state across multiple elements (e.g., session initiation protocol (SIP) call stateful proxies), hang calls associated with certain failures can no longer be cleared. Specifically, any failure that prevents call release messages to reach call stateful elements would result in the creation of hang calls. Hang calls may have adverse effects on a communication network. For example, the hang calls may consume memory and processing resources of various elements within the network or create a lack of synchronization between elements within the network. This can have an adverse impact on subsequent calls within the network.

SUMMARY

In one embodiment, the present disclosure discloses a method, a computer readable medium and an apparatus for clearing hang calls in a communication network. For example, the method detects a failure of an adjacent call stateful network element in a signaling path, identifies one or more calls that are affected by the failure of the adjacent call stateful network element, tests a media path of the one or more calls for activity and clears the one or more calls that are affected by the failure of the adjacent call stateful network element if the media path of the one or more calls is inactive.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, a computer readable medium and an apparatus for clearing hang calls in a communication network. Although the present disclosure is discussed below in the context of Internet Protocol (IP) Multimedia Subsystem (IMS) networks, the present disclosure is not so limited. Namely, the present disclosure can be applied to packet networks in general, e.g., Voice over Internet Protocol (VoIP) networks, Service over Internet Protocol (SoIP) networks, and the like.

Figure 1:
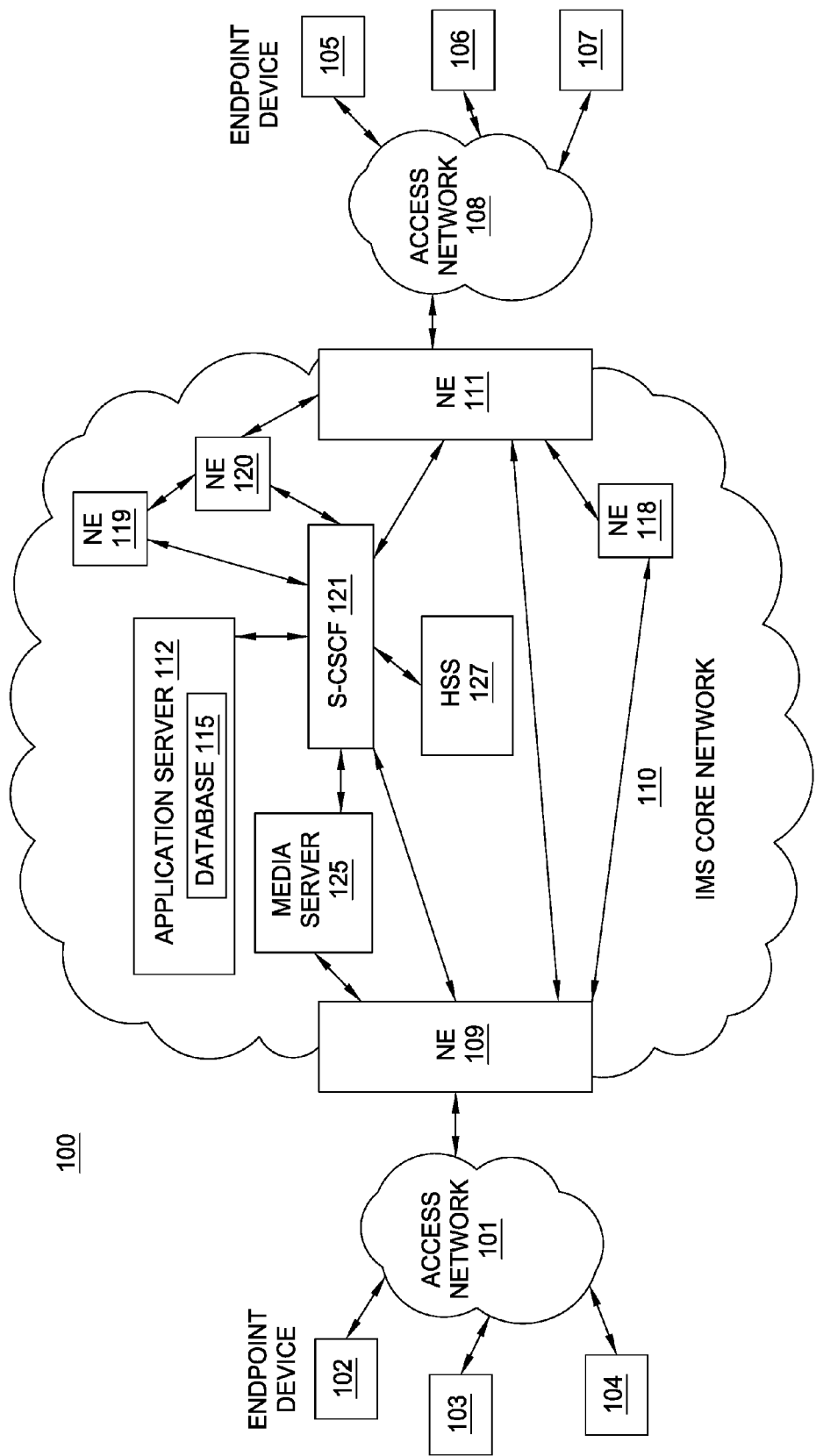
FIG. 1 illustrates an exemplary network related to the present disclosure.

To better understand the present disclosure, FIG. 1 illustrates an example network 100, e.g., an Internet Protocol (IP) Multimedia Subsystem network related to the present disclosure. An IP network is broadly defined as a network that uses Internet Protocol to exchange data packets. Exemplary IP Multimedia Subsystem (IMS) networks include Internet protocol (IP) networks such as Voice over Internet Protocol (VoIP) networks, Service over Internet Protocol (SoIP) networks, and the like.

In one embodiment, the network 100 may comprise a plurality of endpoint devices 102-104 configured for communication with the core IMS network 110 (e.g., an IP based core backbone network supported by a service provider) via an access network 101. Similarly, a plurality of endpoint devices 105-107 are configured for communication with the IMS core packet network 110 via an access network 108. The network elements 109 and 111 may serve as gateway servers or edge routers for the network 110.

The endpoint devices 102-107 may comprise customer endpoint devices such as personal computers, laptop computers, Personal Digital Assistants (PDAs), and the like. The access networks 101 and 108 serve as a means to establish a connection between the endpoint devices 102-107 and the Network Elements (NEs) 109 and 111 of the IMS core network 110. The access networks 101 and 108 may each comprise a Digital Subscriber Line (DSL) network, a broadband cable access network, a Local Area Network (LAN), a Wireless Access Network (WAN), a 3rd party network, and the like. The access networks 101 and 108 may be either directly connected to NEs 109 and 111 of the IMS core network 110, or indirectly through another network.

Some NEs (e.g., NEs 109 and 111) reside at the edge of the IMS core infrastructure and interface with customer endpoints over various types of access networks. An NE that resides at the edge of a core infrastructure is typically implemented as an edge router, a media gateway, a proxy server, a border element, a firewall, a switch, and the like. An NE may also reside within the network (e.g., NEs 118-120) and may be used as a SIP server, a core router, or like device.

The IMS core network 110 also comprises a Home Subscriber Server (HSS) 127, a Serving-Call Session Control Function (S-CSCF) 121, a Media Server (MS) 125, and an Application Server 112 that contains a database 115. An HSS 127 refers to a network element residing in the control plane of the IMS network that acts as a central repository of all customer specific authorizations, service profiles, preferences, etc.

The S-CSCF 121 resides within the IMS core infrastructure and is connected to various network elements (e.g., NEs 109 and 111) using the Session Initiation Protocol (SIP) over the underlying IMS based core backbone network 110. The S-CSCF 121 may be implemented to register users and to provide various services (e.g. VoIP services). The S-CSCF interacts with the appropriate VoIP/SoIP service related applications servers (e.g., 112) when necessary. The S-CSCF 121 performs routing and maintains session timers. The S-CSCF may also interrogate an HSS to retrieve authorization, service information, user profiles, etc. In order to complete a call that requires certain service specific features, the S-CSCF may need to interact with various application servers (e.g. various VoIP servers). For example, the S-CSCF may need to interact with another server for translation of an E.164 voice network address into an IP address, and so on.

The Media Server (MS) 125 is a special server that typically handles and terminates media streams to provide services such as announcements, bridges, and Interactive Voice Response (IVR) messages for VoIP service applications. The media server also interacts with customers for media session management to accomplish tasks such as process requests.

The application server 112 may comprise any server or computer that is well known in the art, and the database 115 may be any type of electronic collection of data that is also well known in the art. Those skilled in the art will realize that the communication system 100 may be expanded by including additional endpoint devices, access networks, network elements, application servers, etc. without altering the scope of the present disclosure.

The above IP network is described to provide an illustrative environment in which packets for voice and data services are transmitted on networks. The current disclosure discloses a method and apparatus for clearing hang calls in an exemplary communication network illustrated in FIG. 1 and as described above.

Figure 2:
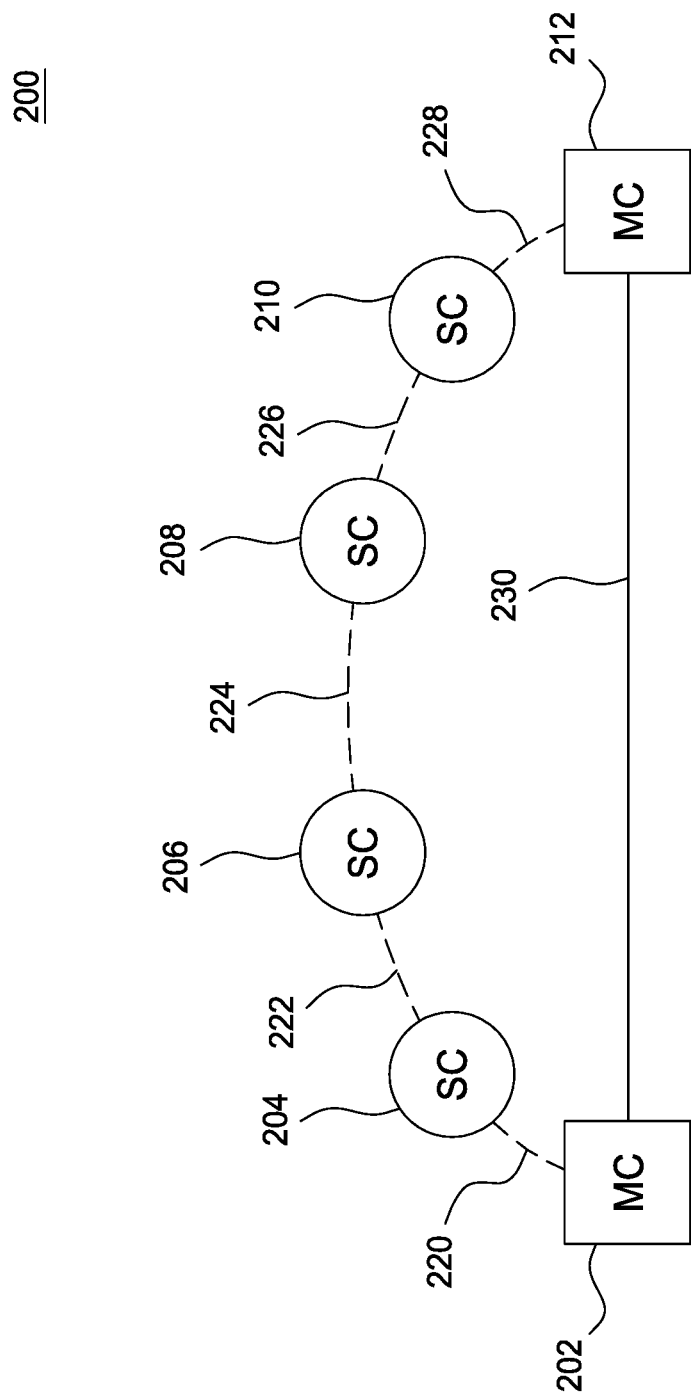
FIG. 2 illustrates an exemplary network in accordance with one embodiment of the current disclosure for clearing hang calls.

FIG. 2 illustrates an exemplary network 200 in accordance with one embodiment of the current disclosure for clearing hang calls in a communication network. The exemplary network 200 may reside within any of the networks illustrated in FIG. 1, e.g. access networks 101 or 108 or the IMS core network 110. In one embodiment, the network 200 includes one or more call stateful network elements. Call stateful network elements are network elements that store call related information for a duration of a call. Usually the call stateful network element releases resources used to store call state data during a call release procedure after a call is terminated. Failure of one or more call stateful network elements to properly release call state data associated with the call will create a hang call in one or more call stateful elements.

It should be noted that the present disclosure only effects call stateful network elements as defined above. In other words, one or more stateless network elements between the two call stateful network elements may be ignored.

Examples of the call stateful network elements include one or more call stateful media components 202 and 212 and one or more call stateful signaling components 204, 206, 208 and 210. Although, two call stateful media components 202 and 212 and four call stateful signaling components 204, 206, 208 and 210 are illustrated, it should be noted that any number of call stateful media components or call stateful signaling components may be included in the network 200.

In one embodiment, the call stateful media components 202 and 212 have media and signaling capabilities. The call stateful media components 202 and 212 may comprise a border element (BE), a media gateway (MG) and the like. In one embodiment, the call stateful signaling components 204, 206, 208 and 210 only have signaling capabilities. The one or more call stateful signaling components 204, 206, 208 and 210 may comprise a call control element (CCE) or signaling gateway (SG) and the like.

The call stateful signaling component may comprise one or more links or signaling channels 220, 222, 224, 226 and 228 between the call stateful signaling components. The call stateful media component may include one or more links, media channels or bearer channels 230 between the call stateful media components 202 and 212.

In one embodiment, the system 200 may detect a hang call when any one of the call stateful network elements (e.g. call stateful media component 202 or 212 or call stateful signaling component 204, 206, 208 and 210) detects a failure in an adjacent call stateful network element. In other words, the present disclosure only requires that a call stateful network element failure in a "next hop" call stateful network element be detected.

Thus, the present disclosure advantageously detects hang calls on a call stateful network element basis rather than a per call basis. For example, on a per call basis, a session timer for each call must be maintained. Thus, a significant amount of memory and processing power is consumed by tracking hundreds of individual session timers and periodically sending heartbeat messages for each active call to monitor the call signaling path availability.

In contrast, the present disclosure saves memory and processing resources by detecting hang calls on a call stateful network element basis. That is, each individual call does not need to be monitored. Rather, each call stateful network element may monitor adjacent call stateful network elements and detect when an adjacent call stateful network element becomes unavailable. Thus, only heartbeat messages to each adjacent call stateful network elements, rather than for each active call, needs to be transmitted to monitor their availability.

Figure 3:
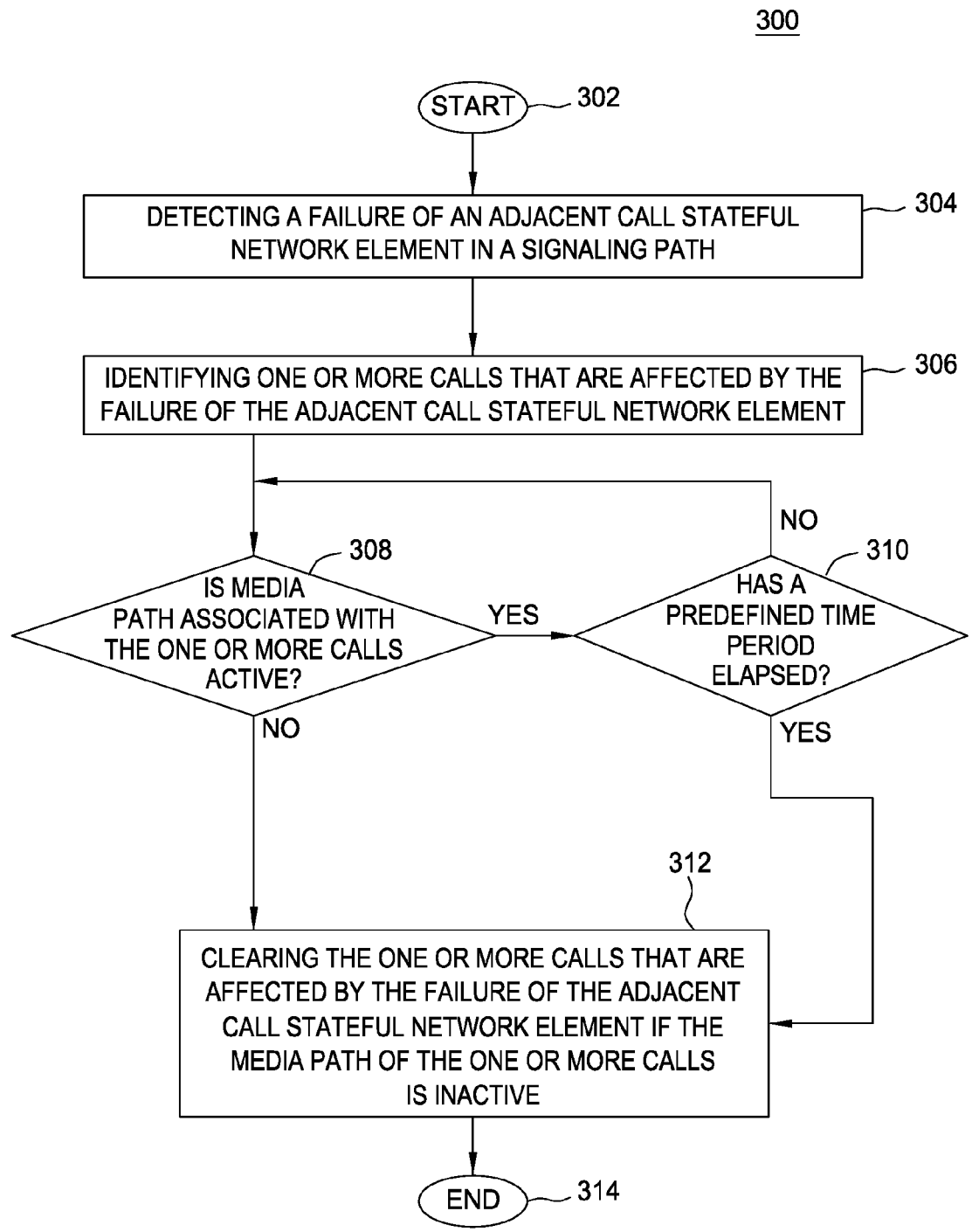
FIG. 3 illustrates a flowchart of a method for clearing hang calls in a communication network.

FIG. 3 illustrates a flowchart of a method 300 for clearing hang calls in a communication network. FIG. 3 may be discussed with examples that reference FIG. 2. In one embodiment, the method 300 is implemented by a call stateful network element having a processor, a memory and input/output devices as illustrated below in FIG. 8. In one embodiment, the call stateful network element may be a call stateful signaling component or a call stateful media component.

The method 300 begins at step 302. At step 304, the method 300 detects a failure of an adjacent call stateful network element in a signaling path. The adjacent call stateful network element failure may be detected using a heart beat message or a time out mechanism. In one embodiment, if session initiation protocol (SIP) is used between the network elements, a SIP OPTION message can be periodically sent to detect failures of an adjacent call stateful network element.

To illustrate by example, referring back to FIG. 2, call stateful signaling component 206 may detect that call stateful signaling component 204 has failed using one of the above mechanisms for detecting a call stateful network element failure. Notably, the present disclosure is applicable if multiple failures are detected. For example, call stateful signaling component 206 may detect that call stateful signaling component 204 and call stateful signaling component 208 have both failed.

In addition, the present disclosure may be applicable if both a calling party and called party utilize the same call stateful media component. For example, the calling party and called party may both utilize call stateful media component 202. If the call stateful signaling component 204 is in a signaling path for such a call it may detect that the call stateful media component 202 has failed and identify such a call as an impacted call.

Moreover, it should be noted that the call stateful network elements need to monitor all adjacent call stateful network elements. In one embodiment, adjacent call stateful network element can be determined during call setup and be defined as the next hop or previous hop call stateful element. For example, with reference to FIG. 2, the call stateful signaling components 206 and 208 are adjacent. However, for different calls with different signaling paths the call stateful signaling components 204 and 210 could be adjacent. Conversely, call stateful signaling components 204 and 206 that appear to be adjacent may not be adjacent for some call signaling paths.

Notably, network links 220, 222, 224, 226 and 228 between the call stateful signaling components in FIG. 2 may represent the paths through the IP backbone network that connect these call stateful signaling components together.

Each call stateful network element does not need to monitor the health of every other call stateful network element in the entire network. Rather, each call stateful network element is only required to monitor those call stateful network elements that considered adjacent to it. This reduces memory and processing loads on each of the network elements.

At step 306, the method 300 identifies one or more calls that are affected by the failure of the adjacent call stateful network element. For example referring back to FIG. 2, if call stateful signaling component 206 detects that call stateful signaling component 204 has failed, then the call stateful signaling component 206 may internally correlate the detected failure with the impacted calls that the call stateful signaling component 206 manages. For example, the call stateful signaling component 206 may internally determine that it manages calls A, B and C. However, signaling for calls A and B are also serviced by the call stateful signaling component 204 that has failed. Thus, the call stateful signaling component 206 identifies that calls A and B are affected by the failure of call stateful signaling component 204.

In addition, the call stateful signaling component 206 propagates call release notifications in all directions along a call path associated with the impacted calls. The call path associated with the impacted calls may also be referred to as the call release path. It should be noted that the call release path may differ from call to call. Depending on the failure scenario and the call release path, the release notification messages may reach some or all call stateful media components that terminate the media channel for a particular impacted call. For example, when the call stateful signaling component 206 determines that call A is impacted by the failure of the call stateful signaling component 204, it will send call release notification for call A in all directions along a call release path for call A. In other words, the call release notification messages are sent to the "next hop" and "previous hop" call stateful network elements in the call release path for call A.

In this particular case, the call stateful signaling component 206 will send a call release notification message for call A to the call stateful signaling component 208 and another call release notification message to the call stateful signaling component 204. The notification message sent toward the failed call stateful signaling component 204 would be lost. Another notification will be received by the call stateful signaling component 208 and will be propagated to the next hop in the call release path associated with call A, i.e., sent to the call stateful signaling component 210. In other words, the call release notification message is propagated further along the call release path by the adjacent call stateful signaling component 208.

Thus, the call stateful signaling component 206 attempts to notify all call stateful media components that carry the bearer paths for each impacted call. This is discussed in further detail below. It should be noted that the call stateful media components 202 and 212 are capable of detecting failure of adjacent call stateful network elements, identifying all calls that are affected by the failure of adjacent call stateful network elements, monitoring activity on call bearer channels and clearing the impacted call.

At step 308, the method 300 monitors if there is activity on a media path of the one or more calls. If the method 300 detects that there is still activity on the media path, then the method 300 proceeds to step 310. At step 310, the method 300 determines if a predefined time period has elapsed (e.g. 60 seconds). If the predefined time period has not elapsed, the method 300 loops back to the beginning of step 308 to wait until no activity is detected. If the predefined time period at step 310 has elapsed, then the method 300 proceeds to step 312. Alternatively, if the method 300 detects that there is no activity on the media path at step 308, then the method 300 may proceed to step 312 from step 308.

At step 312, the method 300 clears the one or more calls that are affected by the failure of the adjacent call stateful network element. Any standard hang call clearing or releasing procedure may be used. For example, SIP BYE messages may be exchanged between the network elements to clear the media channel or bearer channel. The method 300 ends at step 314. Although one example was provided in method 300, it should be noted that the call release procedure may be initiated by both a call stateful signaling component and the call stateful media component, as described below with reference to FIGS. 4-6.

Figure 4:
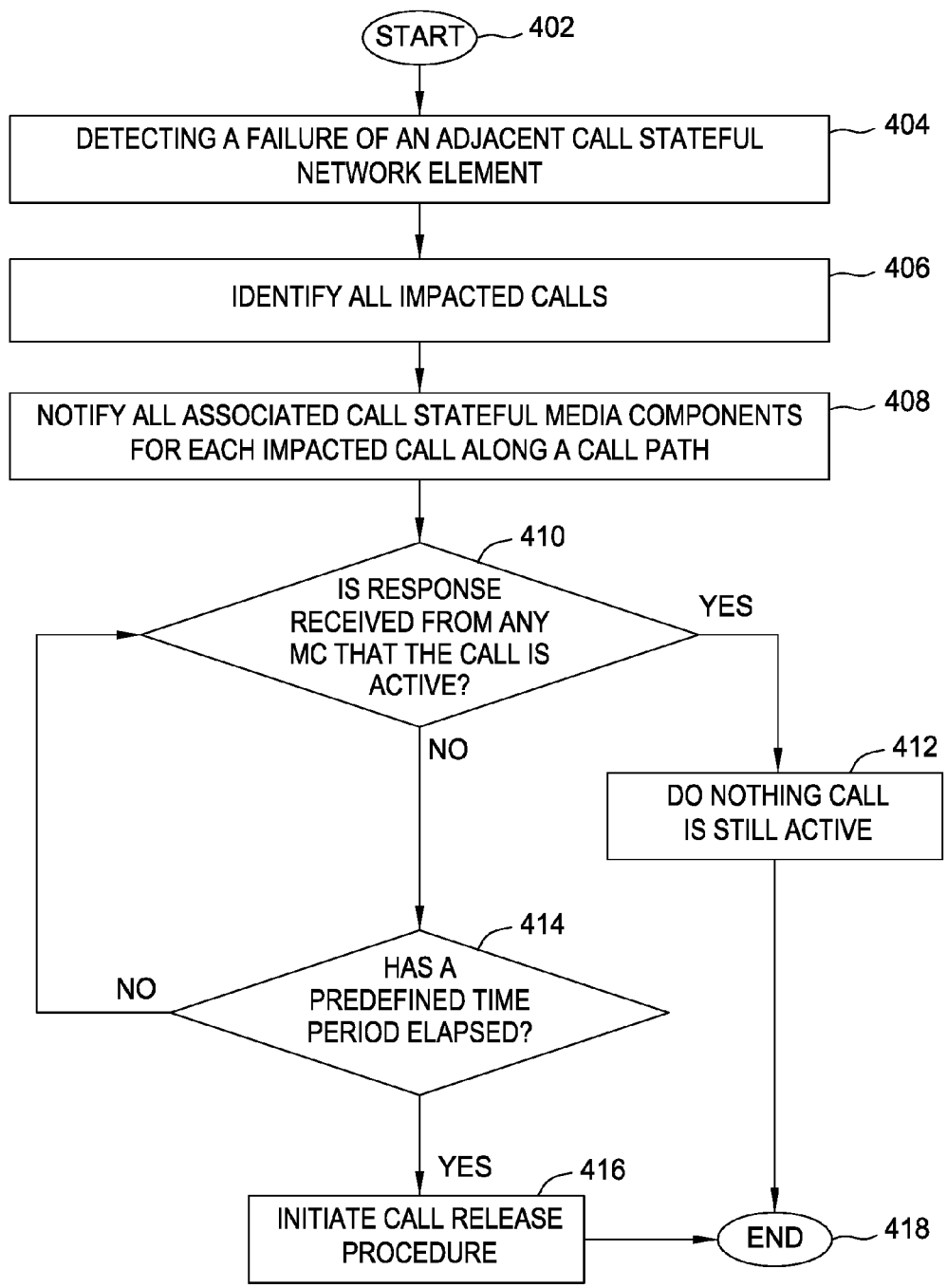
FIG. 4 illustrates a first detailed flowchart of a method for clearing hang calls.

FIG. 4 illustrates a more detailed flow diagram of one embodiment of a method 400 for clearing hang calls in a communication network from a perspective of a call stateful signaling component. FIG. 4 describes the action taken by the call stateful signaling component when it detects a failure of an adjacent call stateful network element. For example, the call stateful signaling component may be any call stateful signaling component 204, 206, 208 or 210 illustrated in FIG. 2.

The method 400 begins at step 402. At step 404, the call stateful signaling component detects a failure of an adjacent call stateful network element, e.g. a call stateful signaling component or a call stateful media component. Any network element failure detection mechanism may be used, as discussed above.

At step 406, the call stateful signaling component identifies all impacted calls. In other words, the call stateful signaling component identifies all calls that are impacted by the failure of the adjacent call stateful network element. As discussed above with reference to FIG. 3, the call stateful signaling component may internally correlate the detected failure with the impacted calls that the call stateful signaling component manages. For example, the call stateful signaling component may internally determine that it manages calls A, B and C. However, only signaling paths for calls A and B are traversing the failed call stateful network element. Thus, the call stateful signaling component identifies that calls A and B are affected by the failed call stateful network element.

At step 408, the call stateful signaling component notifies all call stateful media components associated with each impacted call. As discussed above, and referring to the example of calls A and B that are affected by the failed call stateful network element, the call stateful signaling component tries to notify all call stateful media components that carry the media path for call A and then subsequently for all call stateful media components that carry the media path for call B. In other words, the call stateful signaling component tries to notify all stateful media components that carry each of the affected calls.

Notably, the call stateful signaling component that detected the failure does not need to directly notify the call stateful media components. Rather, the call stateful signaling component that detected the failure only needs to send a call release notification message toward all adjacent call stateful network elements. For example, the call stateful signaling component that detected the failure only needs to propagate a call release notification message along the call clearing path in both directions by sending the call release notification to the "next hop" and "previous hop" call stateful network elements in the clearing path for each impacted call. It should be noted that if for a given impacted call (e.g., call A) one of the adjacent call stateful network elements (e.g., a "next hop" call stateful network element) is the call stateful network element that failed, the call release notification message sent to it would be lost. However, the call release notification message sent to the other call stateful network element (e.g., a "previous hop" call stateful network element) will be propagated further along the call release path.

At step 410, the call stateful signaling component determines if a response is received from any call stateful media component that the call is still active. For example, although a call signaling path fails, the media path may still be available. For example, a calling party and a called party may still be talking over a media channel between two call stateful media components even though the call signaling path failed. Thus, to insure that the conversation is not abruptly ended, the method 400 may monitor activity on any of the media channels or bearer channels of the notified call stateful media components carrying the affected calls. In one embodiment, the call stateful media components may use Real-time transport protocol control protocol (RTCP) to monitor the media channel or bearer channel.

If the response to step 410 is yes, then the method 400 proceeds to step 412 where nothing is done because the call is still active. If the response to step 410 is no, then the method proceeds to step 414.

At step 414, the method 400 determines if a predefined time period has elapsed. The predefined time period may be any time period including 5 minutes, 20 minutes or 24 hours. In one embodiment, the predefined time period may be a relatively long period to ensure the call stateful media components servicing the affected calls have enough time to respond to the call stateful signaling component that activity is detected. For example, the call stateful media component may need a relatively long time to ensure that there is activity on the media channel or bearer channel carrying the affected calls. In one embodiment, the call stateful media component may send a "wait" notification to the call stateful signaling component to restart the predefined time period.

If at step 414 the answer is no, the method 400 returns to step 410 to wait for a response. If the at step 414 the answer is yes, the method 400 proceeds to step 416.

At step 416, the method 400 initiates a call release or call clearing procedure for the hang calls. Either from step 416 or step 412, the method 400 ends at step 418.

Figure 5:
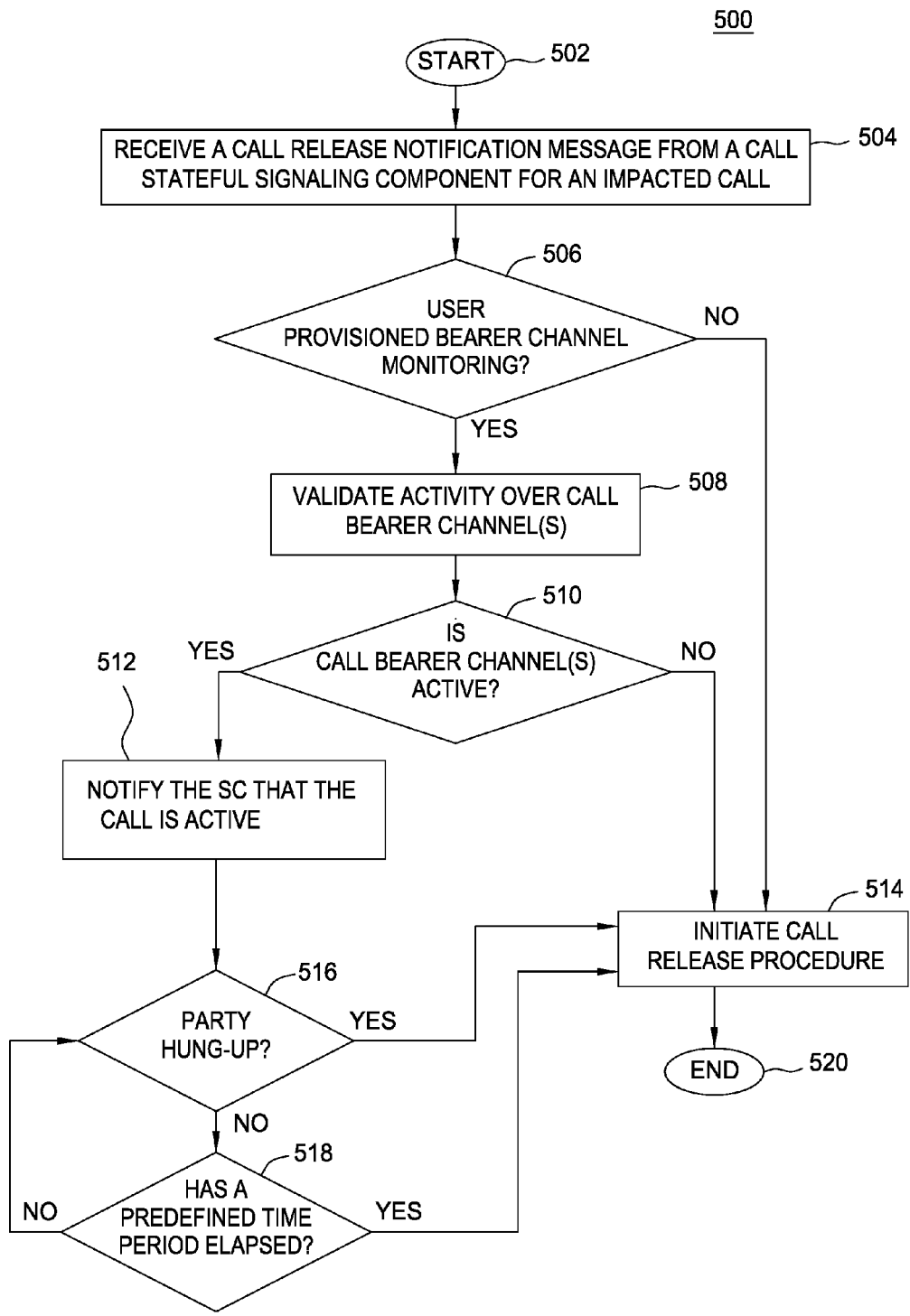
FIG. 5 illustrates a second detailed flowchart of a method for clearing hang calls.

FIG. 5 illustrates a method 500 for actions taken by a call stateful media component when it receives a call release notification from a call stateful component (e.g., a call stateful signaling component). The method 500 begins at step 502.

At step 504, the call stateful media component receives a call release notification message from a call stateful signaling component for an impacted call.

At step 506, the method 500 determines if there is user provisioned bearer channel monitoring. For example, this service may be provided on a subscription basis to prevent users from having their calls abruptly ended due to a hang call. Moreover, the service may be customizable by a subscriber. The subscriber may disable the media channel monitoring feature or change a predetermined time period for monitoring before deciding that no activity exists, e.g., wait 5 minutes, wait 20 minutes or wait 24 hours before determining that there is no activity on the media channel. If the answer is no at step 506, the method proceeds to step 514. At step 514, the call stateful media component initiates a call release procedure. The method 500 proceeds to step 520 and ends.

Referring back to step 506, if the answer is yes at step 506, the method 500 proceeds to step 508. At step 508, the call stateful media component validates activity over the call bearer channels.

At step 510, the method 500 determines if any one of the call bearer channels is active. If at step 510, the answer is no, the method 500 proceeds to step 514 and the call stateful media component initiates a call release procedure. The method 500 then proceeds to step 520 and ends.

Referring back to step 510, if at step 510, the answer is yes, the method 500 proceeds to step 512. At step 512, the call stateful media component sends notification back to the call stateful signaling component that the call is still active and then proceeds to step 516.

At step 516, the method determines if the party has hung up. If the party has hung up, the method 500 proceeds to step 514. If the party has not hung up, the method 500 proceeds to step 518 to determine if a predefined time period (e.g., 20 minutes) has elapsed at step 518. If the predefined time period has not elapsed, then the method 500 loops back to step 516 to wait for the party to hang up. If the predefined time period has elapsed, then the method 500 proceeds to step 514.

At step 514, the method 500 initiates a call release procedure. The method 500 ends at step 520.

Figure 6:
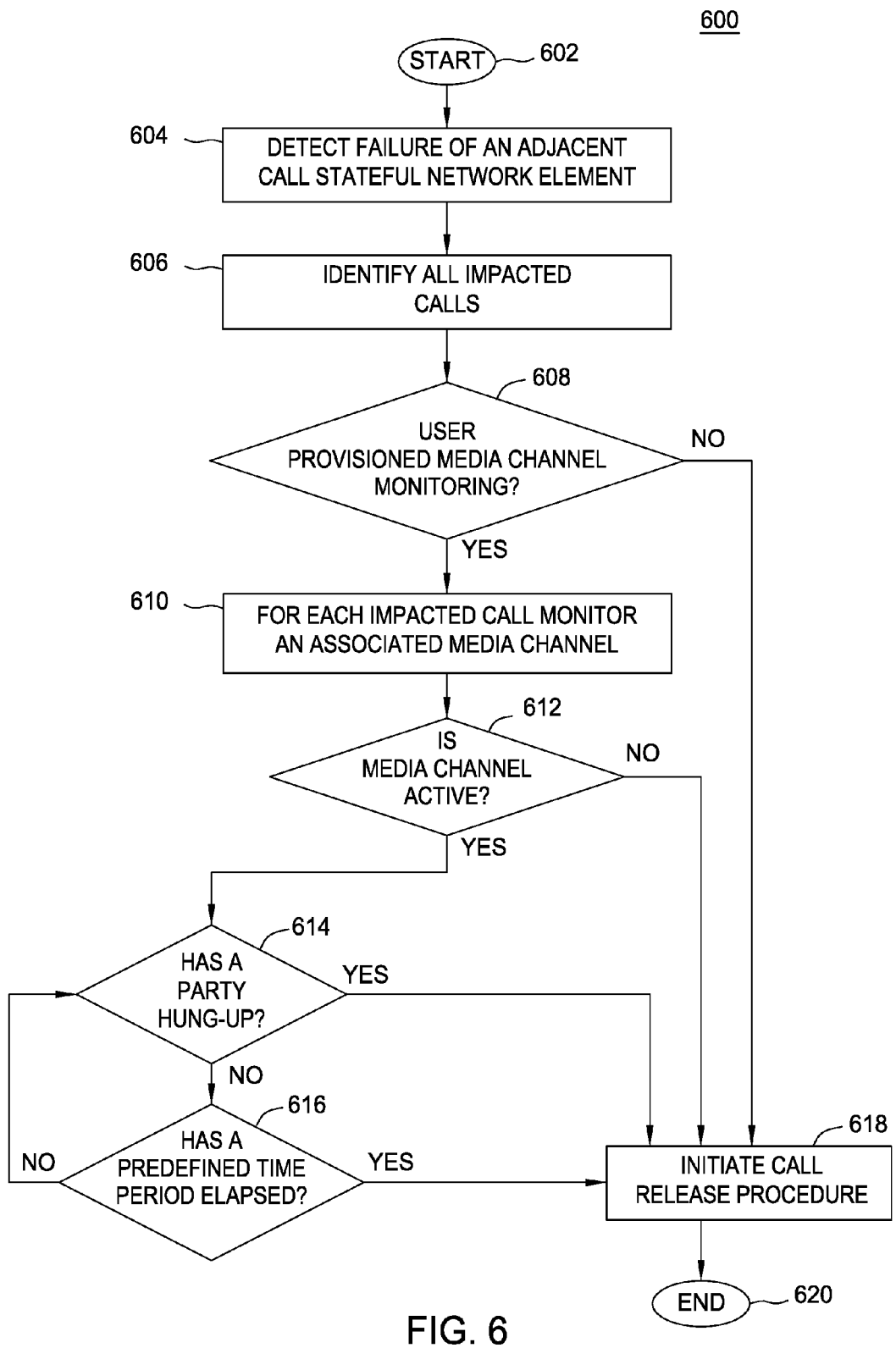
FIG. 6 illustrates a third detailed flowchart of a method for clearing hang calls.

FIG. 6 illustrates a more detailed flow diagram of one embodiment of a method 600 for clearing hang calls in a communication network from a perspective of a call stateful media component. The method 600 describes the action taken by the call stateful media component when it detects a failure of an adjacent call stateful network element. For example, the call stateful media component may be any call stateful media component 202 or 212 illustrated in FIG. 2.

The method 600 begins at step 602. At step 604, the call stateful media component detects a failure of an adjacent call stateful network element, e.g. a call stateful signaling component or a call stateful media component. Any network element failure detection mechanism may be used as discussed above.

At step 606, the call stateful media component identifies all impacted calls. In other words, the call stateful media component determines all calls that are routed through the failed call stateful network element. As discussed above with reference to FIG. 3, the call stateful media component may internally correlate the detected failure with the impacted calls that the call stateful media component manages. For example, the call stateful media component may internally determine that it manages calls A, B and C. However, only signaling paths for calls A and B are traversing the failed network element. Thus, the call stateful media component identifies that calls A and B are affected by the failed network element.

At step 608, the method 600 determines if a user has subscribed to user provisioned media channel monitoring. For example, this service may be provided on a subscription basis to prevent users from having their calls abruptly ended due to a hang call. Moreover, the service may be customizable by a subscriber. The subscriber may disable the media channel monitoring feature or change a predetermined time period for monitoring before deciding that no activity exists, e.g., wait 5 minutes, wait 20 minutes or wait 24 hours before determining there is no activity on the media channel. If the answer to step 608 is no, then the method 600 proceeds to step 618. If the answer to step 608 is yes, the method 600 proceeds to step 610.

At step 610, the method 600 monitors a media channel associated with each impacted call. In other words, the call stateful media component monitors the media channels for activity. The method 600 then proceeds to step 612 to determine if a media channel is active. In one embodiment, the call stateful media components may use RTCP to monitor the media channel or bearer channel. In one embodiment, the call stateful media component may determine there is no activity if a media inactivity time threshold is exceeded. If the answer to step 612 is no, then the method 600 proceeds to step 618. If the answer to step 612 is yes, then the method 600 proceeds to step 614.

Referring back to if the answer to step 612 is no, the method 600 proceeds to step 618. At step 618, the method 600 initiates a call release procedure. The method 600 then proceeds to step 620 and ends.

Referring back to step 612 and if the answer is yes, the method 600 proceeds to step 614. At step 614, the method determines if the party has hung up. If the party has hung up, the method 600 proceeds to step 618. If the party has not hung up, the method 600 proceeds to step 616 to determine if a predefined time period (e.g., 20 minutes) has elapsed. If the predefined time period has not elapsed, then the method 600 loops back to step 614 to wait for the party to hang up. If the predefined time period has elapsed, then the method 600 proceeds to step 618.

At step 618, the method 600 initiates a call release procedure and proceeds to step 620. The method 600 ends at step 620.

Figure 7:
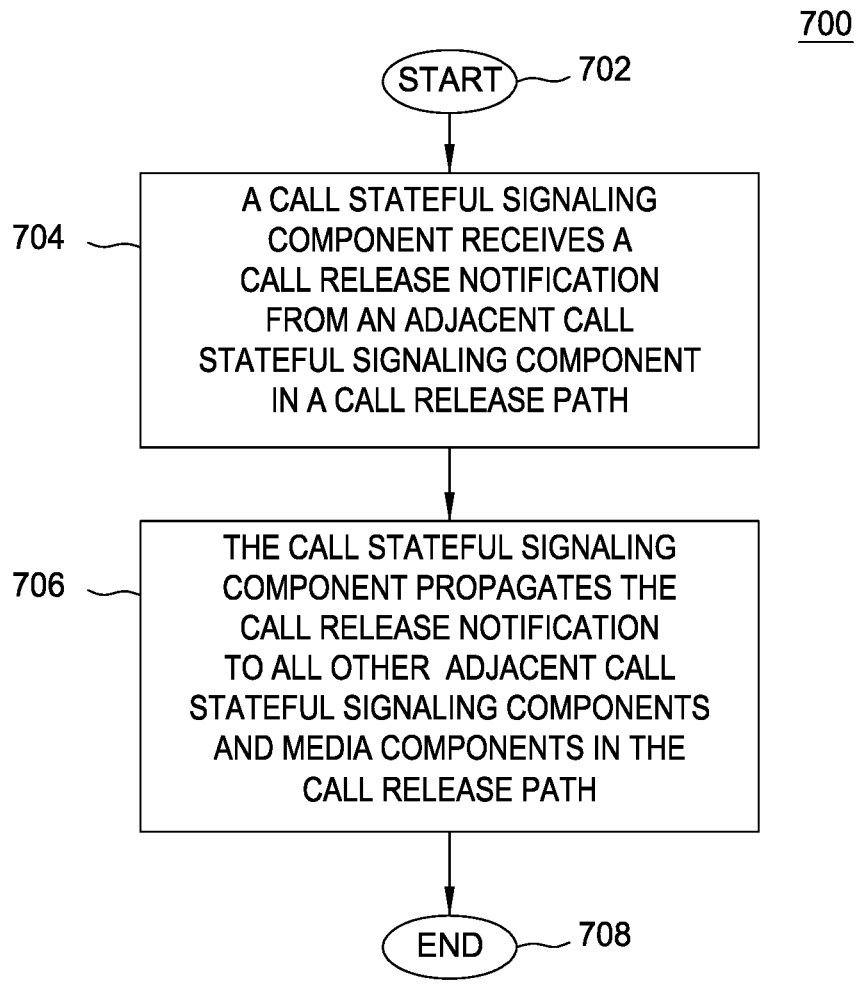
FIG. 7 illustrates a flowchart of a method for propagating a call release notification message.

FIG. 7 illustrates one embodiment of a method 700. The method 700 describes the action taken by a call stateful signaling component when it receives a call release notification message from an adjacent call stateful network element. For example, the call stateful signaling component may be any call stateful signaling component 204, 206, 208 or 210 illustrated in FIG. 2.

The method 700 begins at step 702. At step 704, the call stateful signaling component receives a call release notification from an adjacent call stateful signaling component in a call release path.

At step 706, the call stateful signaling component propagates the call release notification to all other adjacent call stateful signaling components and media components in the call release path by forwarding the call release notification to the next call route hop in the opposite direction of the call release notification originator. The method ends at step 708.

It should be noted that although not specified, one or more steps of the above methods may include a storing, displaying and/or outputting step as required for a particular application. In other words, any data, records, fields, and/or intermediate results discussed in the above methods can be stored, displayed and/or outputted to another device as required for a particular application. Furthermore, any steps in the above methods that recite a determining operation or involve a decision, do not necessarily require that both branches of the determining operation be practiced. In other words, one of the branches of the determining operation can be deemed as an optional step.

Figure 8:
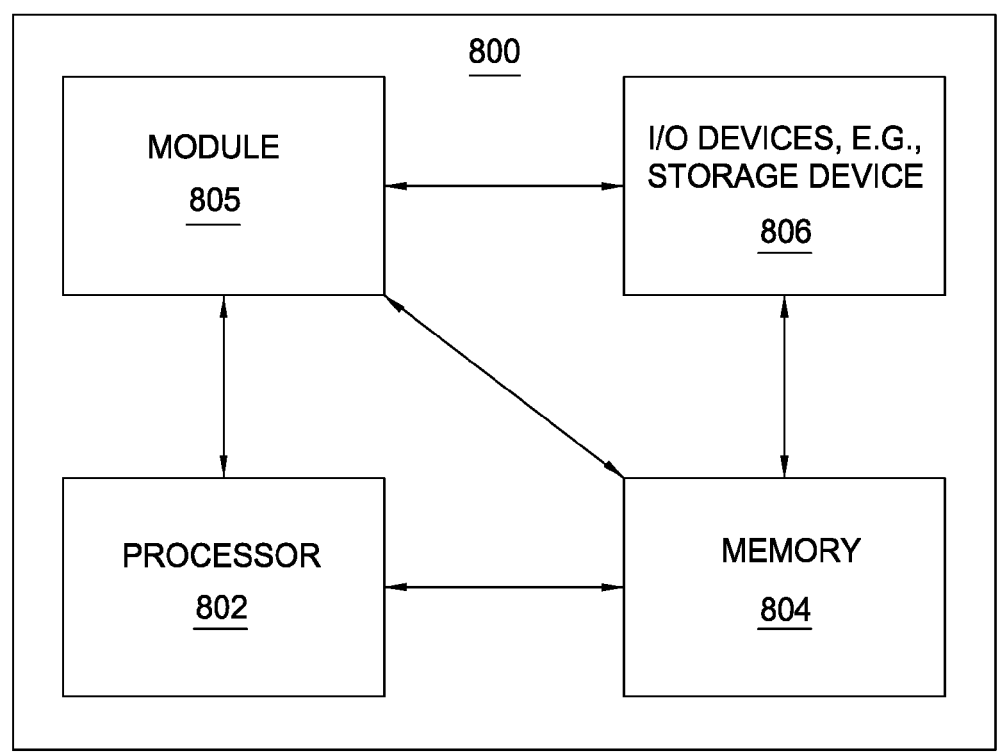
FIG. 8 illustrates a high-level block diagram of a general-purpose computer suitable for use in performing the functions described herein.

FIG. 8 depicts a high-level block diagram of a general-purpose computer suitable for use in performing the functions described herein. As depicted in FIG. 8, the system 800 comprises a processor element 802 (e.g., a CPU), a memory 804, e.g., random access memory (RAM) and/or read only memory (ROM), a module 805 for clearing hang calls in a communication network, and various input/output devices 806 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 805 for clearing hang calls in a communication network can be loaded into memory 804 and executed by processor 802 to implement the functions as discussed above. As such, the present method 805 for clearing hang calls in a communication network (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for clearing a call in a communication network, the method comprising:

detecting, by a processor of a call stateful network element in a signaling path of the call, a failure of an adjacent call stateful network element in the signaling path of the call, wherein the adjacent call stateful network element comprises a next hop network element in the signaling path, wherein the communication network comprises a voice over internet protocol network, wherein the failure of the adjacent call stateful network element in the signaling path of the call is detected via a heartbeat message from the processor of the call stateful network element to the adjacent call stateful network element, wherein the heartbeat message is sent independent of a plurality of calls processed by the call stateful network element including the call;

identifying, by the processor, a plurality of existing calls that is affected by the failure of the adjacent call stateful network element, wherein the plurality of existing calls includes the call;

sending, by the processor, a call release notification message via another adjacent call stateful network element in a call release path of each of the plurality of existing calls to notify a call stateful media component of each of the plurality of existing calls of the failure of the adjacent call stateful network element;

monitoring, by the processor, a predefined time period; and clearing, by the processor, the call when the predefined time period has elapsed.

2. The method of claim 1, further comprising:

propagating the call release notification message further along the call release path of the call by all other adjacent call stateful network elements that are properly functioning in the call release path of the call.

3. The method of claim 1, wherein the call stateful network element comprises a border element.

4. The method of claim 1, wherein the call stateful network element comprises a media gateway.

5. The method of claim 1, wherein the call stateful network element comprises a call control element.

6. The method of claim 1, wherein the call stateful network element comprises a signaling gateway.

7. The method of claim 1, wherein the adjacent call stateful network element comprises a link.

8. The method of claim 1, wherein the adjacent call stateful network element comprises a media channel.

9. A non-transitory computer-readable medium storing instructions which, when executed by a processor of a call stateful network element in a signaling path of a call in a communication network, cause the processor to perform operations for clearing the call, the operations comprising:
   detecting a failure of an adjacent call stateful network element in the signaling path of the call, wherein the adjacent call stateful network element comprises a next hop network element in the signaling path, wherein the communication network comprises a voice over internet protocol network, wherein the failure of the adjacent call stateful network element in the signaling path of the call is detected via a heartbeat message from the processor of the call stateful network element to the adjacent call stateful network element, wherein the heartbeat message is sent independent of a plurality of calls processed by the call stateful network element including the call;
   identifying a plurality of existing calls that is affected by the failure of the adjacent call stateful network element, wherein the plurality of existing calls includes the call;
   sending a call release notification message via another adjacent call stateful network element in a call release path of each of the plurality of existing calls to notify a call stateful media component of each of the plurality of existing calls of the failure of the adjacent call stateful network element;
   monitoring a predefined time period; and
   clearing the call when the predefined time period has elapsed.

10. The non-transitory computer-readable medium of claim 9, wherein the call release notification message is propagated further along the call release path of the call by all other adjacent call stateful network elements that are properly functioning in the call release path of the call.

11. The non-transitory computer-readable medium of claim 9, wherein the call stateful network element comprises a border element.

12. The non-transitory computer-readable medium of claim 9, wherein the call stateful network element comprises a media gateway.

13. The non-transitory computer-readable medium of claim 9, wherein the call stateful network element comprises a call control element.

14. The non-transitory computer-readable medium of claim 9, wherein the call stateful network element comprises a signaling gateway.

15. The non-transitory computer-readable medium of claim 9, wherein the adjacent call stateful network element comprises a link.

16. The non-transitory computer-readable medium of claim 9, wherein the adjacent call stateful network element comprises a media channel.

17. An apparatus for clearing a call in a communication network, the apparatus comprising:
   a processor of a call stateful network element in a signaling path of the call; and
   a computer-readable medium storing instructions which, when executed by the processor, cause the processor to perform operations, the operations comprising:
      detecting a failure of an adjacent call stateful network element in the signaling path of the call, wherein the adjacent call stateful network element comprises a next hop network element in the signaling path, wherein the communication network comprises a voice over internet protocol network, wherein the failure of the adjacent call stateful network element in the signaling path of the call is detected via a heartbeat message from the processor of the call stateful network element to the adjacent call stateful network element, wherein the heartbeat message is sent independent of a plurality of calls processed by the call stateful network element including the call;
      identifying a plurality of existing calls that is affected by the failure of the adjacent call stateful network element, wherein the plurality of existing calls includes the call;
      sending a call release notification message via another adjacent call stateful network element in a call release path of each of the plurality of existing calls to notify a call stateful media component of each of the plurality of existing calls of the failure of the adjacent call stateful network element;
      monitoring a predefined time period; and
      clearing the call when the predefined time period has elapsed.

18. The apparatus of claim 17, wherein the call release notification message is propagated further along the call release path of the call by all other adjacent call stateful network elements that are properly functioning in the call release path of the call.

19. The apparatus of claim 17, wherein the call stateful network element comprises a border element, a media gateway, a call control element, or a signaling gateway.

20. The apparatus of claim 17, wherein the adjacent call stateful network element comprises a link or a media channel.

* * * * *